B. WOLHAUPTER.

WELDED RAIL ANCHOR.

Reissued Oct. 25, 1921.

APPLICATION FILED AUG. 15, 1921.

15,216.

2 SHEETS—SHEET 1.

Inventor

Benjamin Wolhaupter

WITNESSES:—

Chas. L. Gieshauer

Emory L. Groff

By

Attorney

B. WOLHAUPTER.

WELDED RAIL ANCHOR.

Reissued Oct. 25, 1921. 15,216.

APPLICATION FILED AUG. 15, 1921.

2 SHEETS—SHEET 2.

Inventor

Benjamin Wolhaupter,

By D. W. Wolhaupter

Attorney

WITNESSES:—

Chas. L. Griesbauer

Emory L. Groff

UNITED STATES PATENT OFFICE.

BENJAMIN WOLHAUPTER, OF NEW ROCHELLE, NEW YORK.

WELDED RAIL-ANCHOR.

15,216. Specification of Reissued Letters Patent. Reissued Oct. 25, 1921.

Original No. 1,369,208, dated February 22, 1921, Serial No. 430,821, filed December 15, 1920. Reissue No. 15,132, dated June 21, 1921, Serial No. 466,596, filed May 3, 1921. This application for reissue filed August 15, 1921. Serial No. 492,321½.

*To all whom it may concern:*

Be it known that I, BENJAMIN WOLHAUPTER, a citizen of the United States, residing at New Rochelle, Westchester county, State of New York, have invented certain new and useful Improvements in Welded Rail-Anchors; and I do hereby declare the following to be a full, clear, and exact description of the invention, such as will enable others skilled in the art to which it appertains to make and use the same.

This invention relates to rail anchors of the type adapted to be welded directly to the rail and arranged to abut against the tie to prevent the creeping of the rails longitudinally in the track.

One of the objects of the invention is to provide a simple and practical rail anchor that may be economically made and applied, while at the same time embodying all of the necessary requirements to successfully meet track and road bed conditions, also possessing the additional advantages of being quickly and easily removed or detached from the rail by a blow from a spike maul or the like. In this connection the invention contemplates the disposition of a portion of the rail anchor in an exposed position at the edge of the rail to present what may be conveniently termed a driving-off head.

A further object of the invention is to provide a rail anchor which may be made from simple sections or pieces of rolled steel or from standard "flats" cut to length and bent into such a shape that the portion thereof below the plane of the rail base will afford an amplified and increased bearing engagement with the side face of the tie, while the opposite ends thereof are secured firmly to the edges of the rail by suitable welds to insure effectual resistance to the creeping thrust of the rail.

With the above and other objects in view which will more readily appear as the nature of the invention is better understood the same consists in the novel construction, combination and arrangement of parts hereinafter more fully described, illustrated and claimed.

A preferred and practical embodiment of the invention is shown in the accompanying drawings, in which:—

Like references designate corresponding parts throughout the several figures of the drawings.

As previously indicated, a primary object of the invention is to provide a simple form of anchor adapted to be carried by the base of the rail and depending therefrom to engage with a side face of the tie T to afford an extended abutment while the opposite ends of the anchor are rigidly secured to the rail.

Figure 3:
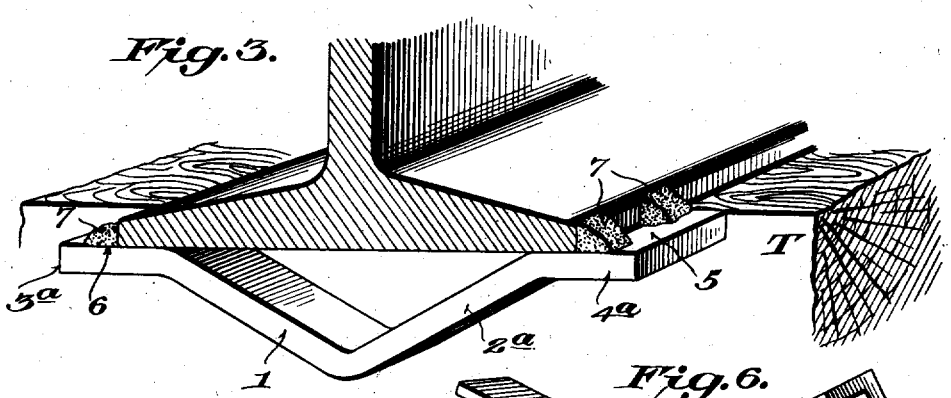
Fig. 3 is a perspective view of a modified form of the anchor.
Figure 4:
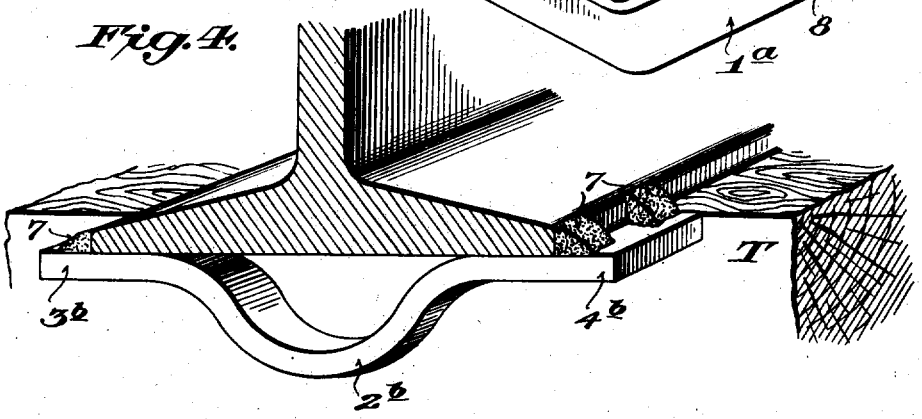
Fig. 4 is a perspective view similar to Figs. 1 and 3, and showing a further modified form of anchor.
Figure 5:
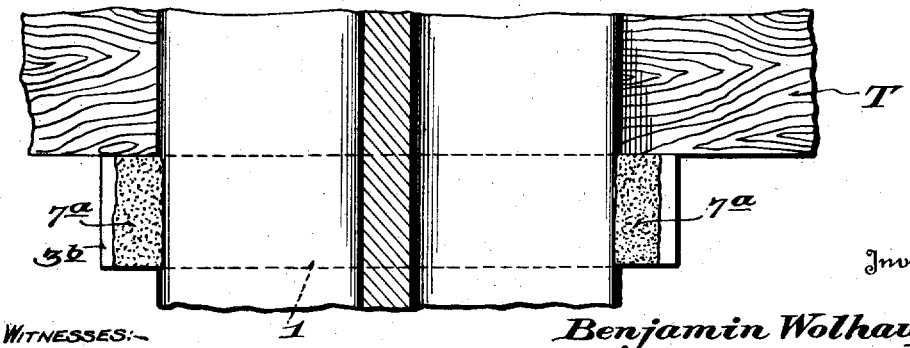
Fig. 5 is a plan view showing a fillet weld.

As shown in the drawings, an anchor of the present type is preferably made from a rolled strip or bar 1 whose intermediate portion is depressed or bowed as at 2, presenting a relatively deep and long abutment member for engagement with a tie, while the opposite ends 3 and 4 thereof extend beyond the opposite edges of the rail base to provide the channels or grooves 5 and 6 for receiving the material of the welds 7 which may be of the spot weld type as shown in Figs. 1 to 4 or the fillet type $7^a$ as shown in Fig. 5. In connection with the ends 3 and 4 of the anchor which project beyond the edges of the rail base, it is to be noted that the same provide what may be conveniently termed driving-off heads at the exposed edges of the rails so that a blow from a suitable track instrument or hammer may be conveniently directed thereagainst to rupture or break the welds and disengage the anchor from the rail without injury thereto whenever it is necessary to remove the anchor in the resetting or reusing of the rail.

The spot welds 7 readily permit of the facile removal of the anchor from the rail, as will be readily understood, but in utilizing this type of weld, it is pointed out that the aggregate strength of the several welds is sufficiently strong in every case to effectually resist the creeping force of the rail. And, where a weld of the fillet type is used and the channel or space between the ends of the anchor and the edges of the rail base is entirely filled, it is to be noted that the provision of the so-called driving-off heads will assist in the removal by reason of the increased leverage afforded by the relatively large area of metal for receiving the hammer blow.

Figure 1:
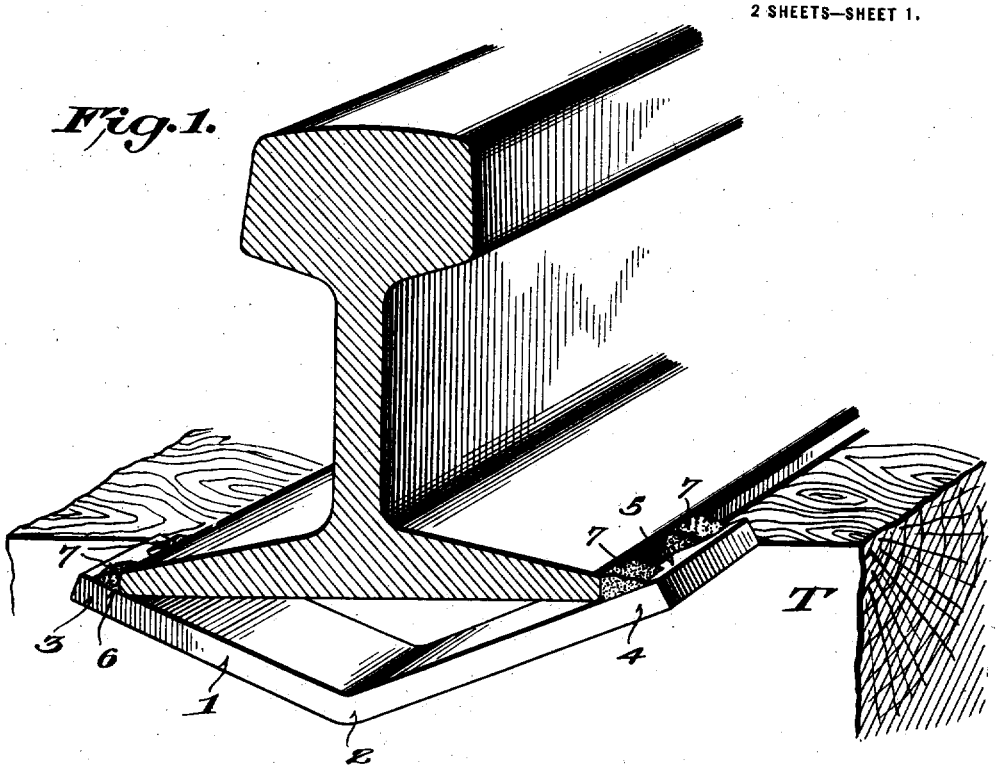
Figure 1 is a perspective view of one form of the rail anchor in its applied position on the rail base.
Figure 2:
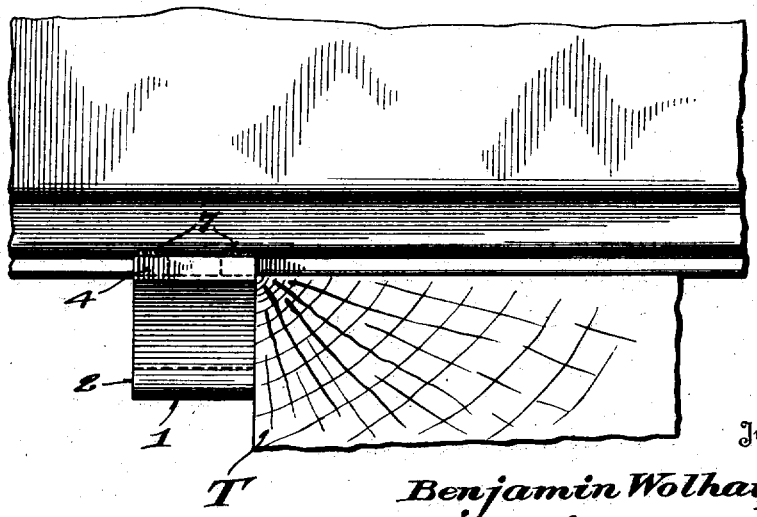
Fig. 2 is a side elevation of the structure shown in Fig. 1.

In the form of the invention shown in Figs. 1 and 2, it will be observed that the intermediate depressed portion of the anchor may conveniently assume the form of an angular or V-bow with the oppositely inclining legs thereof extending uniformly from the apex of the V bow upwardly to and beyond the edges of the rail base. That is to say, the anchor bar may be readily formed by simply bending or bowing the entire section or strip between its ends, by a single bend, the bend or bow assuming the V formation of Figs. 1 and 2.

This general type of anchor may also be preserved in the modification shown in Fig. 3 wherein the intermediate depressed tie engaging abutment $2^a$, while in the form of a V-bow has the upper ends $3^a$ and $4^a$ thereof disposed parallel to the base of the rail to provide in effect holding feet for the anchor which may be utilized to receive the weld in the same manner as in the construction of Fig. 1, and to also provide the driving-off head which is very desirable in facilitating the removal of the anchor from the rail.

A further modification of the construction is shown in Fig. 4 of the drawings wherein the anchor is provided with an intermediate depending portion of curving formation producing an easy bend at the middle of the plate which constitutes the tie engaging abutment $2^b$ while the ends of the bar at opposite sides of the bow constitute the driving-off heads and welding projections $3^b$ and $4^b$.

Figure 6:
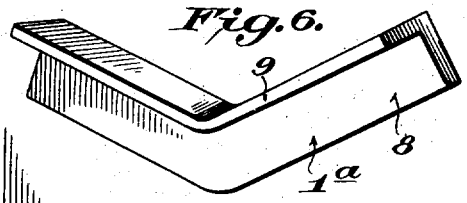
Fig. 6 is a detail perspective view of the anchor made of a section of angle iron.

A further very practical embodiment of the invention is illustrated in Fig. 6 of the drawings which shows the anchor formed from a section of angle bar designated by the reference character $1^a$ and having one of its flanges 8 vertically disposed to provide a wide and substantial tie abutting surface, while its other horizontally disposed flange 9 constitutes a reinforcing element which materially contributes to the strength of the bar. In the angle bar formed by the invention shown in Fig. 6, the anchor is formed merely by bending or bowing the entire section or bar between its ends, producing a single centrally located bend.

From the foregoing, it will be apparent that the novel and distinctive feature of the present invention is the provision of an anchor arranged transversely of the rail base and depending therefrom, the opposite ends thereof being welded to the rail edges in such a manner as to present the exposed driving-off heads while the intermediate depending or depressed portion of the anchor presents an extended abutment member for engaging with the tie. Although several forms of the invention have been shown in the drawings, it will of course be understood that other changes in the form, proportion and minor details of construction may be resorted to without departing from the spirit or sacrificing any of the advantages of the invention.

I claim:

1. A rail anchor consisting of a bent bar extending across the rail base and welded to the edges of the rail flanges.

2. A rail anchor consisting of a bent bar extending across the rail base and having projecting ends welded to the edges of the rail flanges.

3. A rail anchor consisting of a bent bar extending across the rail base and having ends projecting beyond the edges of the rail flanges, and welded connections between said projecting ends and the edges of the rail flanges.

4. A rail anchor consisting of a single bent bar extending across the rail base and welded at its ends to the edges of the rail flanges.

5. A rail anchor consisting of a bar extending across the rail base and welded to the edges of the rail flanges, said bar being bent between its ends forming a tie abutting member.

6. A rail anchor consisting of a bar extending across the rail base and welded to the edges of the rail flanges, said bar having an intermediate depressed bend forming a tie abutting member.

7. A rail anchor consisting of a bar extending across the rail base and welded to the edges of the rail flanges, said bar having a single intermediate bend forming a depressed tie abutting member.

8. A rail anchor consisting of a bar extending across the rail base and welded to the edges of the rail flanges, said bar being bent downwardly at its intermediate portion to provide upwardly inclining tie engaging portions.

9. A rail anchor consisting of a bar having an intermediate depressed portion providing upwardly inclining parts adapted to extend to and project beyond the edges of the rail flanges to provide driving-off heads, and welds connecting the edges of the rail flanges and the ends of the bar adjacent thereto.

10. A rail anchor consisting of a bent angle bar extending across the rail base and welded to the edges of the rail flanges.

11. A rail anchor consisting of a single bent angle bar extending across the rail base and welded at its ends to the edges of the rail flanges.

12. A rail anchor consisting of a body part extending across the rail base and welded to the edges of the flanges, said body part having a depending abutment-engaging portion.

13. A rail anchor consisting of a body part extending across the rail base and fillet welded to the edges of the flanges, said body part having a depending abutment-engaging portion.

14. A rail anchor consisting of a body part extending across the rail base and welded to the rail flanges, said anchor having a face projecting below the rail bottom forming an abutment-engaging member.

In testimony whereof I hereunto affix my signature in the presence of two witnesses.

BENJAMIN WOLHAUPTER.

Witnesses:

LILLIAN LEINER,

ANDREW ARNOLD, Jr.